(12) United States Patent
Aoi et al.

(10) Patent No.: US 11,891,978 B2
(45) Date of Patent: Feb. 6, 2024

(54) WIND TURBINE BLADE, MONITORING APPARATUS FOR WIND TURBINE BLADE AND WIND POWER GENERATING APPARATUS, AND MONITORING METHOD FOR WIND TURBINE BLADE

(71) Applicant: MITSUBISHI HEAVY INDUSTRIES, LTD., Tokyo (JP)

(72) Inventors: Tatsufumi Aoi, Tokyo (JP); Syusaku Yamamoto, Tokyo (JP); Naoto Murata, Tokyo (JP); Yoichiro Tsumura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/010,116

(22) PCT Filed: Oct. 19, 2021

(86) PCT No.: PCT/JP2021/038514
§ 371 (c)(1),
(2) Date: Dec. 13, 2022

(87) PCT Pub. No.: WO2022/085655
PCT Pub. Date: Apr. 28, 2022

(65) Prior Publication Data
US 2023/0265835 A1      Aug. 24, 2023

(30) Foreign Application Priority Data
Oct. 20, 2020   (JP) .................................. 2020-176259

(51) Int. Cl.
*F03D 17/00*   (2016.01)
*F03D 80/30*   (2016.01)

(52) U.S. Cl.
CPC ............. *F03D 17/00* (2016.05); *F03D 80/30* (2016.05)

(58) Field of Classification Search
CPC ................................. F03D 17/00; F03D 80/30
See application file for complete search history.

(56) References Cited

U.S. PATENT DOCUMENTS

| 8,258,773 B2 | 9/2012 | Brnada |
| 2007/0041834 A1 | 2/2007 | Schram et al. |

(Continued)

FOREIGN PATENT DOCUMENTS

| JP | 2012-117446 A | 6/2012 |
| JP | 2017-150827 A | 8/2017 |
| JP | 2019-120219 A | 7/2019 |

OTHER PUBLICATIONS

International Search Report of PCT/JP2021/038514, dated Dec. 21, 2021 (9 pages).

(Continued)

*Primary Examiner* — Brian O Peters
(74) *Attorney, Agent, or Firm* — Osha Bergman Watanabe & Burton LLP

(57) ABSTRACT

A wind turbine blade includes: a blade body; a down conductor extending along a longitudinal direction of the blade body; and at least a pair of magnetic field sensors disposed inside the blade body and at opposite positions across the down conductor, a pair of magnetic field sensors being configured to detect a local magnetic field at each of the positions. At least the pair of magnetic field sensors includes: a first sensor disposed on a first axis passing through an installation position of the down conductor in a cross section intersecting the longitudinal direction; and a (Continued)

second sensor disposed on a second axis passing through the installation position and being orthogonal to the first axis in the cross section.

12 Claims, 8 Drawing Sheets

(56) References Cited

U.S. PATENT DOCUMENTS

2012/0133146 A1    5/2012   Naka et al.
2013/0028739 A1*   1/2013   Erichsen ................. F03D 80/30
                                                                          324/72
2020/0173423 A1*   6/2020   Kirkegaard ............ G08C 17/00

OTHER PUBLICATIONS

International Preliminary Report on Patentability dated May 4, 2023 in corresponding International (PCT) Application No. PCT/JP2021/038514 (12 pages with English Translation).

* cited by examiner

WIND TURBINE BLADE, MONITORING APPARATUS FOR WIND TURBINE BLADE AND WIND POWER GENERATING APPARATUS, AND MONITORING METHOD FOR WIND TURBINE BLADE

TECHNICAL FIELD

The present disclosure relates to a wind turbine blade, a monitoring apparatus for the wind turbine blade and a wind power generating apparatus, and a monitoring method for the wind turbine blade.

This application claims the priority of Japanese Patent Application No. 2020-176259 filed on Oct. 20, 2020, the content of which is incorporated herein by reference.

BACKGROUND

A wind turbine blade is provided with a receptor (lightning receiving part) as a device for protecting the wind turbine blade from lightning. The receptor is disposed at a tip portion of the wind turbine blade or another location, and is electrically connected to a down conductor (pull-down conductor) extending through the wind turbine blade and a wind turbine tower. A lightning current when lightning strikes the receptor is guided to the ground via the down conductor and discharged.

Patent Document 1 discloses a system for detecting lightning strikes on wind turbine rotor blades provided with a plurality of receptors. The system for detecting lightning strikes includes a plurality of current sensors respectively provided in correspondence with the plurality of receptors. The plurality of current sensors, respectively, detect currents flowing through branch lines (conductors) respectively connecting between the plurality of receptors and conductors (down conductors) extending inside the wind turbine blades. Then, based on detection results in the plurality of current sensors, the system detects that the wind turbine blade has been struck by lightning and identifies the lightning-struck receptor.

CITATION LIST

Patent Literature

Patent Document 1: U.S. Pat. No. 8,258,773B

SUMMARY

Technical Problem

Meanwhile, even a wind turbine blade provided with a receptor may be struck by lightning at a location other than a location where the receptor is installed, for example, a surface of a blade body (shell or the like). Therefore, it is desirable to be able to appropriately identify the lightning-struck position in the wind turbine blade, in order to appropriately or quickly perform maintenance, for example, in case where the wind turbine blade is damaged by the lightning strike.

However, the system for detecting lightning strikes described in Patent Document 1 does not take into consideration a case where lightning strikes a location other than the receptor, such as the surface of the blade body, and it is impossible to identify whether the lightning strikes either the receptor installation location or a location other than the receptor installation location.

In view of the above, an object of at least one embodiment of the present invention is to provide a wind turbine blade whose lightning-struck position can appropriately be identified, a monitoring apparatus for the wind turbine blade and a wind power generating apparatus, and a monitoring method for the wind turbine blade.

Solution to Problem

A wind turbine blade according to at least one embodiment of the present invention includes: a blade body; a down conductor extending along a longitudinal direction of the blade body; and at least a pair of magnetic field sensors disposed inside the blade body and at opposite positions across the down conductor, the pair of magnetic field sensors being configured to detect a local magnetic field at each of the positions.

Further, a monitoring apparatus according to at least one embodiment of the present invention is a monitoring apparatus for a wind turbine blade that includes a blade body and a down conductor extending along a longitudinal direction of the blade body, including: at least a pair of magnetic field sensors disposed inside the blade body and in the wind turbine blade at opposite positions across the down conductor, the pair of magnetic field sensors being configured to detect a local magnetic field at each of the positions; and a lightning-struck position information acquisition part for acquiring information about a lightning-struck position of the wind turbine blade, based on a detection signal of each of at least the pair of magnetic field sensors.

Furthermore, a wind power generating apparatus according to at least one embodiment of the present invention includes: a wind turbine rotor including the above-described wind turbine blade; a generator configured to be driven by rotation of the wind turbine rotor; and a monitoring apparatus including a lightning-struck position information acquisition part for acquiring information about a lightning-struck position of the wind turbine blade, based on a detection signal of each of at least the pair of magnetic field sensors.

Advantageous Effects

According to at least one embodiment of the present invention, provided are a wind turbine blade whose lightning-struck position can appropriately be identified, a monitoring apparatus for the wind turbine blade and a wind power generating apparatus, and a monitoring method for the wind turbine blade.

DETAILED DESCRIPTION

Figure 1:
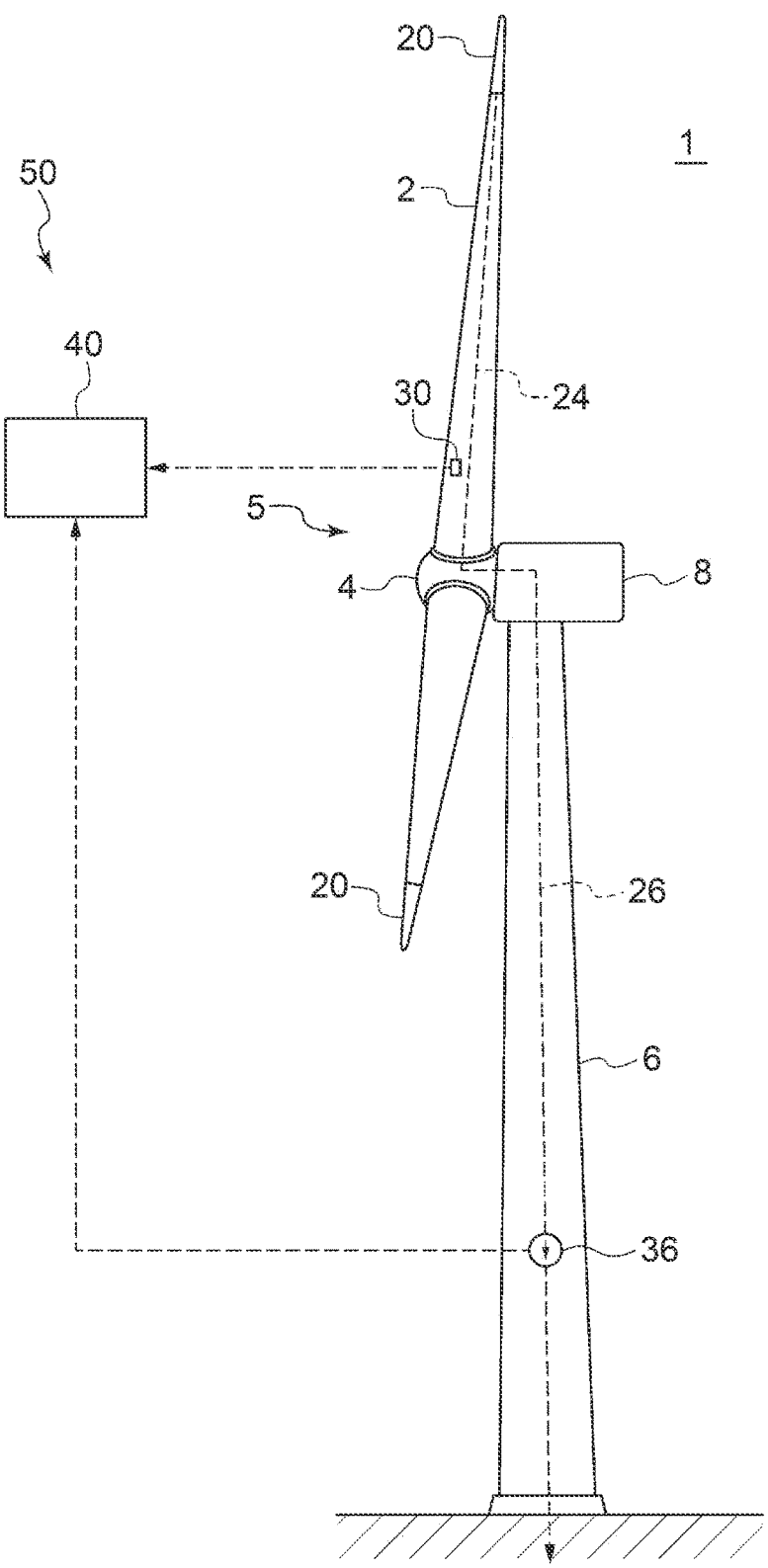
FIG. 1 is a schematic view of a wind power generating apparatus according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

(Configurations of Wind Power Generating Apparatus and Wind Turbine Blade)

Figure 2:
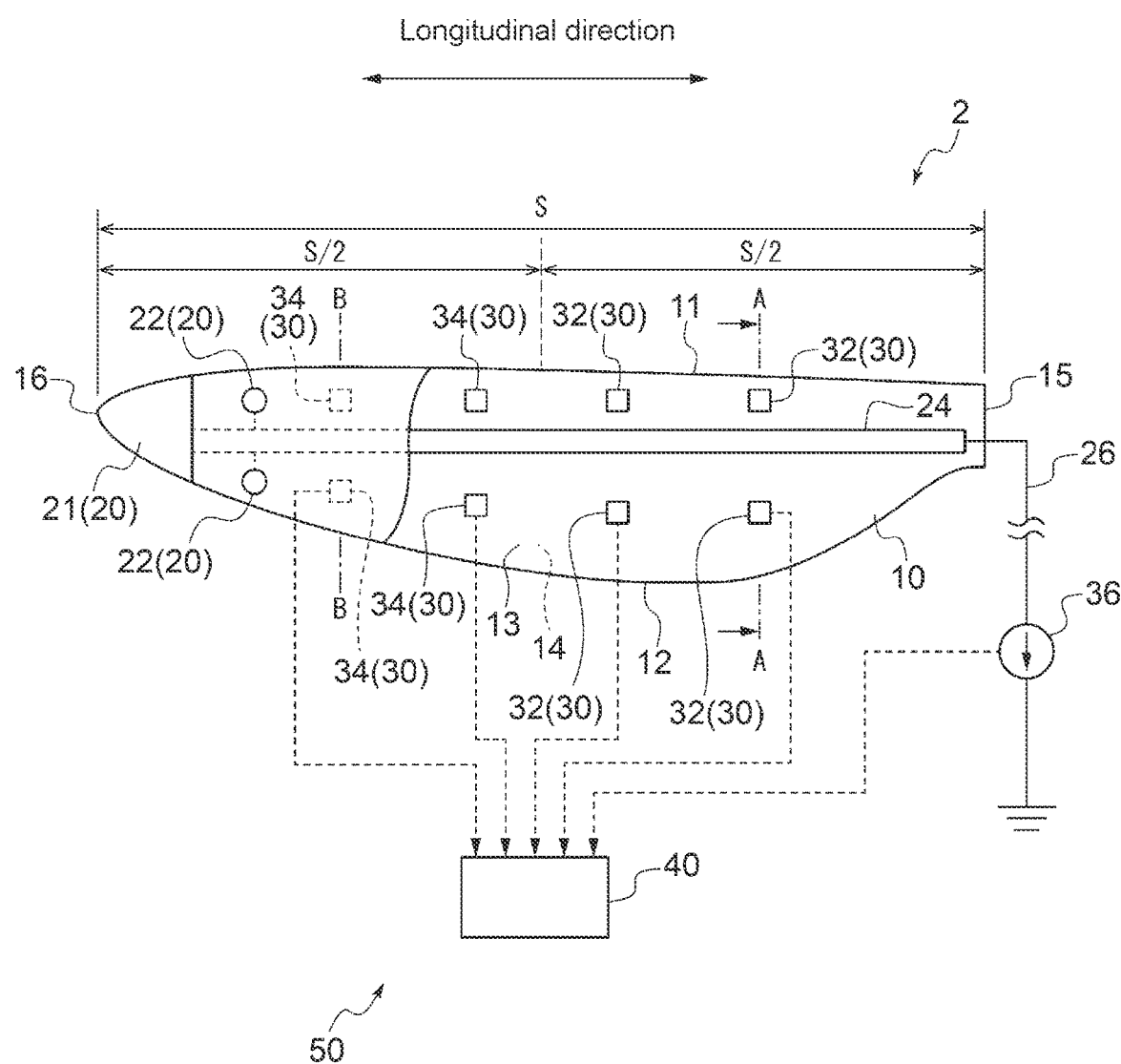
FIG. 2 is a schematic view of a wind turbine blade according to an embodiment.
Figure 3:
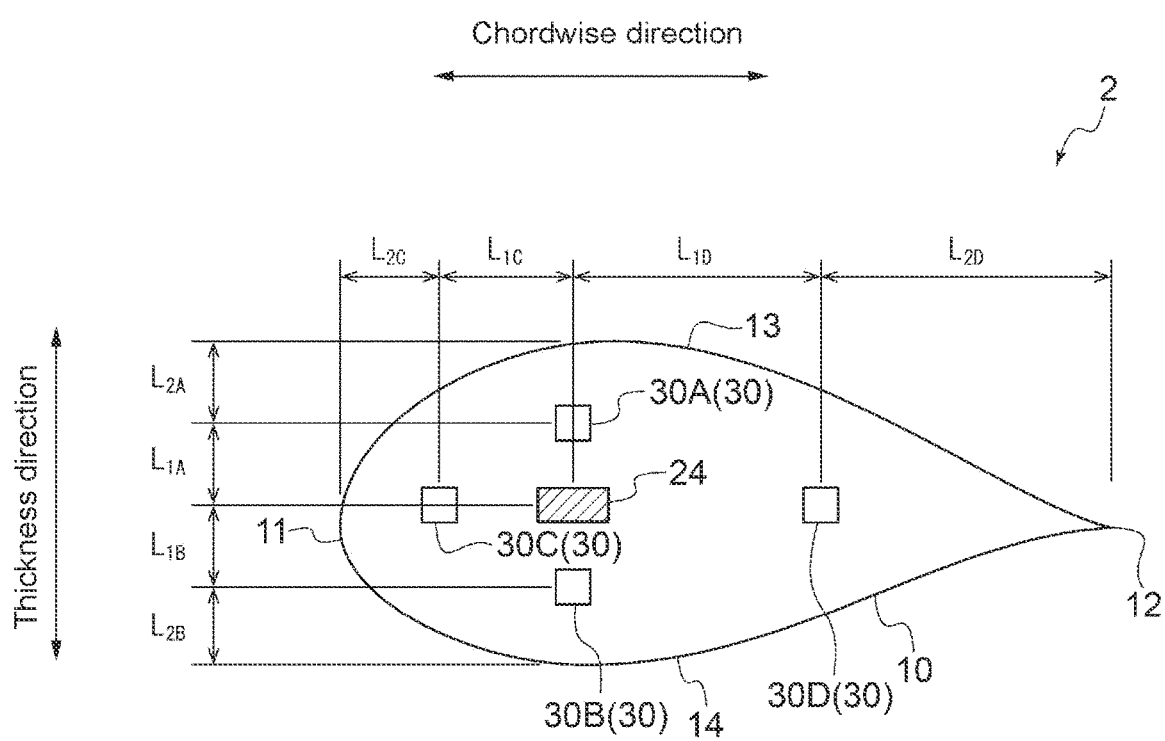
FIG. 3 is a schematic view of the wind turbine blade according to an embodiment.
Figure 4:
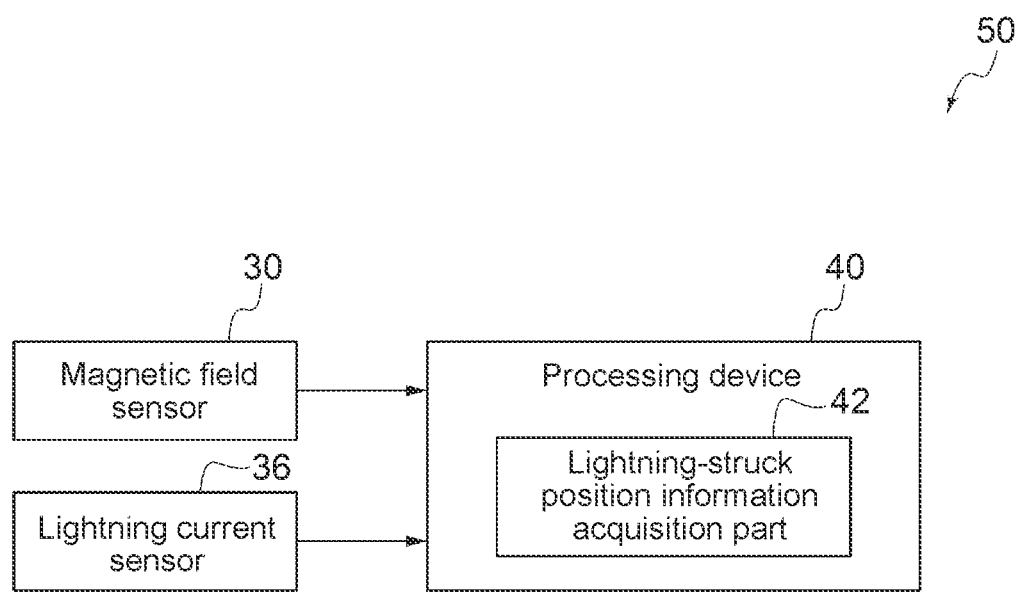
FIG. 4 is a schematic configuration diagram of monitoring according to an embodiment.

FIG. 1 is a schematic view of a wind power generating apparatus to which a wind turbine blade or a monitoring apparatus is applied according to some embodiments. FIGS. 2 and 3 are each a schematic view of the wind turbine blade according to an embodiment. FIG. 2 is a cross-sectional view orthogonal to the longitudinal direction of the wind turbine blade, and FIG. 3 shows a cross section taken along line A-A in FIG. 2. FIG. 4 is a schematic configuration diagram of monitoring according to an embodiment.

As shown in FIG. 1, a wind power generating apparatus 1 includes a rotor (wind turbine rotor) 5 composed of at least one (for example, three) wind turbine blade 2 and a hub 4. The wind turbine blade 2 is radially mounted on a hub 4, and the wind turbine blade 2 receives wind to rotate the rotor 5 and drives a generator (not shown) connected to the rotor 5. In the embodiment shown in FIG. 1, the rotor 5 is supported by a nacelle 8 disposed on an upper side of a tower 6. The tower 6 may be disposed upright on a base structure, such as a foundation structure or a floating structure, disposed on water or on land.

As shown in FIGS. 1 to 3, the wind turbine blade 2 includes a blade body 10 including a shell (casing), a down conductor 24 extending along the longitudinal direction of the blade body 10 (hereinafter, also simply referred to as the longitudinal direction), and at least a pair of magnetic field sensors 30 disposed inside the blade body 10.

As shown in FIG. 2, the blade body 10 includes a blade root 15 mounted on the hub 4 of the wind power generating apparatus 1, a blade tip 16 located farthest from the hub 4, and an airfoil portion extending between the blade root 15 and the blade tip 16. Further, as shown in FIGS. 2 and 3, the blade body 10 has a leading edge 11 and a trailing edge 12 from the blade root 15 to the blade tip 16. Furthermore, an exterior shape of the blade body 10 is formed by a suction surface (convex surface) 13 and a pressure surface (concave surface) 14. The suction surface 13 and the pressure surface 14 of the blade body 10 include a surface of the shell. The blade body 10 may be formed from fiber reinforced plastic.

The blade body 10 is provided with receptors (lightning receiving parts) 20. The receptors 20 are formed from an electrically conductive material, and is typically made from metal. The receptors 20 may include a receptor 21 disposed in an area including the blade tip 16, and/or a receptor 22 disposed on the surface (the suction surface 13 or the pressure surface 14) of the blade body 10 at a position between the area and the blade root 15 in the longitudinal direction.

The down conductor 24 of the wind turbine blade 2 is composed of, for example, a conducting wire, electrically connected to each of the above-described receptors 20, and connected to a down conductor 26 extending inside the tower 6. A lightning current when lightning strikes the wind turbine blade 2 (the receptors 20 or the like) is guided to the outside of the wind power generating apparatus 1 such as the earth (ground) via the down conductor 24 and the down conductor 26.

The down conductor 24 may extend inside the blade body 10 along the longitudinal direction, for example, as shown in FIG. 3. Alternatively, the down conductor 24 may extend along the surface (the suction surface 13 or the pressure surface 14) of the blade body 10 along the longitudinal direction (see FIG. 6A, 6B).

At least the pair of magnetic field sensors 30 are disposed at positions on both sides across the down conductor 24 inside the blade body 10, and are configured to detect local magnetic fields at the respective positions. That is, each of the magnetic field sensors 30 is disposed at the position spaced apart from the down conductor 24 inside the blade body 10, and is configured to detect the direction of the magnetic field or the like at this position. Therefore, when the lightning current flows through the down conductor 24 or the blade body 10 and the magnetic field is generated around the lightning current, each of the above-described magnetic field sensors 30 can detect the direction of the magnetic field or the like at the installation position of the magnetic field sensor 30. The magnetic field sensors 30 may be supported by the shell or a spar of the blade body 10.

An example of the installation position of the magnetic field sensor 30 will be detailed in detail later. In the example shown in FIG. 3, the down conductor 24 is disposed inside the blade body 10, and a plurality of magnetic field sensors 30A to 30D are disposed inside the blade body 10 in a cross section orthogonal to the longitudinal direction. The magnetic field sensor 30A is disposed between the down conductor 24 and the suction surface 13, the magnetic field sensor 30B is disposed between the down conductor 24 and the pressure surface 14, the magnetic field sensor 30C is disposed between the down conductor 24 and the leading edge 11, and the magnetic field sensor 30D is disposed between the down conductor 24 and the trailing edge 12.

Each of the magnetic field sensors 30 is a sensor capable of detecting the direction of the magnetic field at the installation position of the magnetic field sensor 30. As the magnetic field sensor 30, a sensor having effective responsiveness to a frequency component of the lightning current can preferably be used. As the magnetic field sensor 30, for example, a loop coil sensor, a B-dot sensor, or a hall element sensor can be used.

The wind power generating apparatus 1 may include a lightning current sensor 36 disposed on a path of a lightning current from the down conductor 24 toward the ground. The lightning current sensor 36 may be configured to detect the polarity (positive or negative) of the lightning current from down conductor 24 to the ground. Further, the lightning current sensor 36 may be configured to detect the magnitude of the above-described lightning current. Alternatively, the lightning current sensor 36 may be configured to measure a current value of the above-described lightning current. Then, a processor, such as a processing device 40 which will be described later, may identify the polarity of the lightning current or may identify the magnitude of the lightning current from a current waveform indicating a time change in current measurement value by the lightning current sensor 36.

The lightning current sensor 36 is disposed between the ground and the down conductor 24 of the wind turbine blade 2. The lightning current sensor 36 may be disposed inside the blade body 10, or may be disposed inside the nacelle or inside the tower (see FIG. 1).

The lightning current flowing through the blade body 10 toward the ground normally flows into the down conductor 24 before reaching the ground. Thus, even if lightning strikes the blade body 10 and the lightning current flows through the blade body 10, the above-described lightning current sensor 36 can detect the polarity of the lightning current.

The wind power generating apparatus 1 shown in FIG. 1 further includes a monitoring apparatus 50 for monitoring the wind turbine blade 2. As shown in FIGS. 1, 2, and 4, the monitoring apparatus 50 includes at least the pair of magnetic field sensors 30 and/or the lightning current sensor 36 described above, and the processing device 40 for processing a signal detected by at least the pair of magnetic field sensors 30 and/or the lightning current sensor 36. The processing device 40 includes a lightning-struck position information acquisition part 42 configured to acquire information about a lightning-struck position of the wind turbine blade 2, based on the detection signal of at least the pair of magnetic field sensors and/or the lightning current sensor 36. The detection signal from at least the pair of magnetic field sensors 30 and/or the lightning current sensor 36 may be transmitted to the processing device 40 by a cable, an optical fiber, or radio.

The processing device 40 may include a calculator with a processor (such as CPU), a storage device (memory device; such as RAM), an auxiliary storage part, an interface, and the like. The processing device 40 receives the signal from at least the pair of magnetic field sensors 30 and/or the lightning current sensor 36 described above via the interface. The processor is configured to process the signal thus received. In addition, the processor is configured to process programs loaded into the storage device. Whereby, the function of the lightning-struck position information acquisition part 42 described above is realized.

The processing contents in the processing device 40 may be implemented as programs executed by the processor. The programs may be stored in the auxiliary storage part. When executed, these programs are loaded into the storage device. The processor reads out the programs from the storage device to execute instructions included in the programs.

The processing device 40 may be disposed inside the tower 6 or the nacelle 8 of the wind power generating apparatus 1. Alternatively, some or all of the functions of the processing device 40 may be disposed outside (remote location or the like) the wind power generating apparatus 1.

(Monitoring Flow and Arrangement Example of Magnetic Field Sensor)

Herein, an overview of a monitoring method for the wind turbine blade 2 of the wind power generating apparatus 1 described above will be described. In some embodiments, at least the pair of magnetic field sensors 30 described above is used to detect a local magnetic field at the installation position of each of the magnetic field sensors 30. Then, based on the detection result of each of the magnetic field sensors 30, the above-described lightning-struck position information acquisition part 42 or the like acquires the information about the lightning-struck position of the wind turbine blade 2.

Hereinafter, the arrangement examples of the magnetic field sensors 30 in the wind turbine blade 2 and characteristics of the above-described monitoring when the respective arrangement examples are adopted will be described. FIGS. 5A and 5B, FIGS. 6A and 6B, FIG. 7, and FIG. 8 are each a schematic cross-sectional view of the wind turbine blade 2 according to an embodiment, and are each a cross-sectional view orthogonal to the longitudinal direction of the wind turbine blade 2.

In FIGS. 5A to 8, the X axis is an axis in a direction connecting the leading edge 11 and the trailing edge 12 (that is, a chordwise direction of the wind turbine blade 2) (note that a direction from the leading edge 11 toward the trailing edge is positive), the Y axis is an axis in a direction orthogonal to the X axis (that is, a thickness direction of the wind turbine blade 2) (note that a direction from the pressure surface 14 toward the suction surface 13 is positive), and the Z axis is an axis in a direction orthogonal to the X axis and the Y axis (that is, the longitudinal direction of the wind turbine blade 2) (note that a direction from the blade tip 16 side (the front side of the drawing) toward the blade root 15 side (the back side of the drawing) is positive).

Figure 5A:
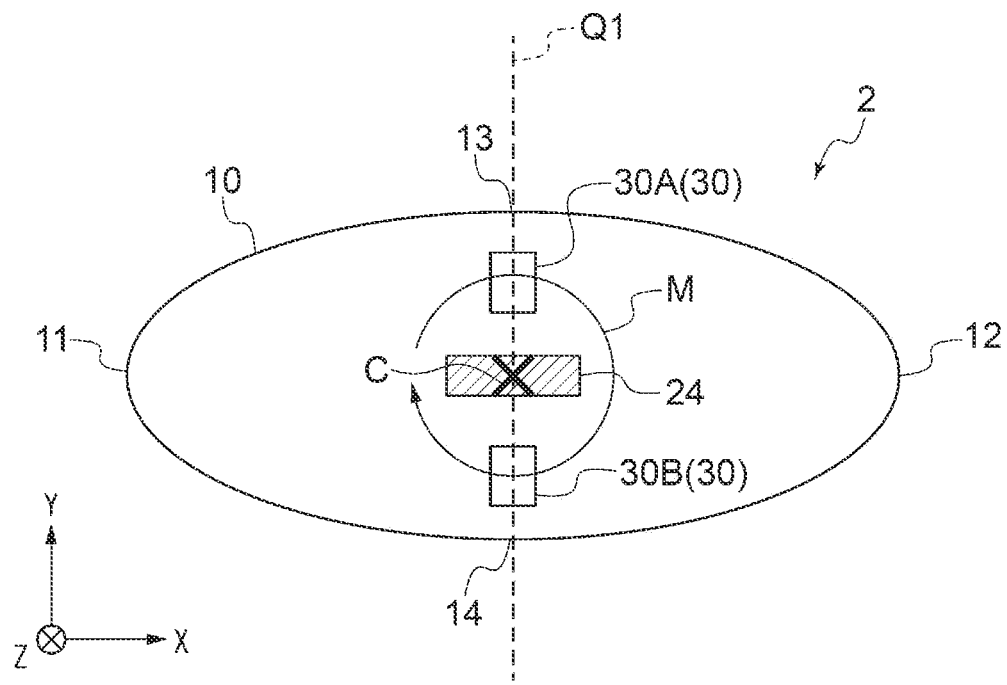
FIG. 5A is a schematic cross-sectional view of the wind turbine blade according to an embodiment.

Further, in FIGS. 5A to 8, reference sign C indicates a lightning current, and reference sign M indicates a direction of a magnetic field generated around the lightning current. Furthermore, FIGS. 5A and 5B show the same cross section of the same wind turbine blade 2, but portions through which the lightning current flows are different. Specifically, the lightning current C flows through the down conductor 24 in FIG. 5A, whereas the lightning current C flows through the surface (more specifically, the surface on the suction surface 13 side in FIG. of the blade body 10 in FIG. 5B. The same also applies to FIG. 6A and FIG. 6B.

In the following description, it is assumed that the lightning current C in FIGS. 5A to 8 is a positive polarity lightning current. In this case, as shown in FIGS. 5A to 8, the magnetic field M is generated around the lightning current C in the right (clockwise) direction on the drawing.

As shown in FIGS. 5A to 8, at least the pair of magnetic field sensors 30 is disposed inside the blade body 10.

In the embodiments shown in FIGS. 5A-5B, FIGS. 6A-6B, FIG. 7, and FIG. 8, the down conductor 24 is disposed inside the blade body 10. Further, in FIGS. 5A to 8, the magnetic field sensor 30A is the magnetic field sensor 30 disposed between the down conductor 24 and the suction surface 13, the magnetic field sensor 30B is the magnetic field sensor 30 disposed between the down conductor 24 and the pressure surface 14, the magnetic field sensor is the magnetic field sensor 30 disposed between the down conductor 24 and the leading edge 11, and the magnetic field sensor 30D is the magnetic field sensor 30 disposed between the down conductor 24 and the trailing edge 12.

When the lightning current C flows through the wind turbine blade 2, the magnetic field M is generated around the lightning current C. Herein, the direction of the magnetic field M at the position of the magnetic field sensor 30 differs depending on a positional relationship between the magnetic field sensor 30 and the portion of the wind turbine blade 2 where the lightning current C flows.

In some embodiments, for example, as shown in FIGS. 5A to 8, the at least one magnetic field sensor 30 includes a pair of magnetic field sensors 30 disposed on the both sides of the down conductor 24. For example, in the exemplary embodiments shown in FIGS. 5A-FIG. 7, and FIG. 8, a pair of magnetic field sensors 30A, 30B are disposed on the both sides of the down conductor 24 in the Y-axis direction (thickness direction). Further, for example, in the exemplary embodiments shown in FIGS. 6A and 6B, FIG. 7, and FIG. 8, a pair of magnetic field sensors 30C, 30D are disposed on both sides of the down conductor 24 in the X-axis direction (chordwise direction).

According to the above-described embodiments, since a pair of magnetic field sensors 30 (the magnetic field sensors 30A and 30B or the magnetic field sensors 30C and 30D) are disposed on both sides of the down conductor 24, it is possible to determine whether the lightning current C has flowed through the down conductor 24.

Figure 5B:
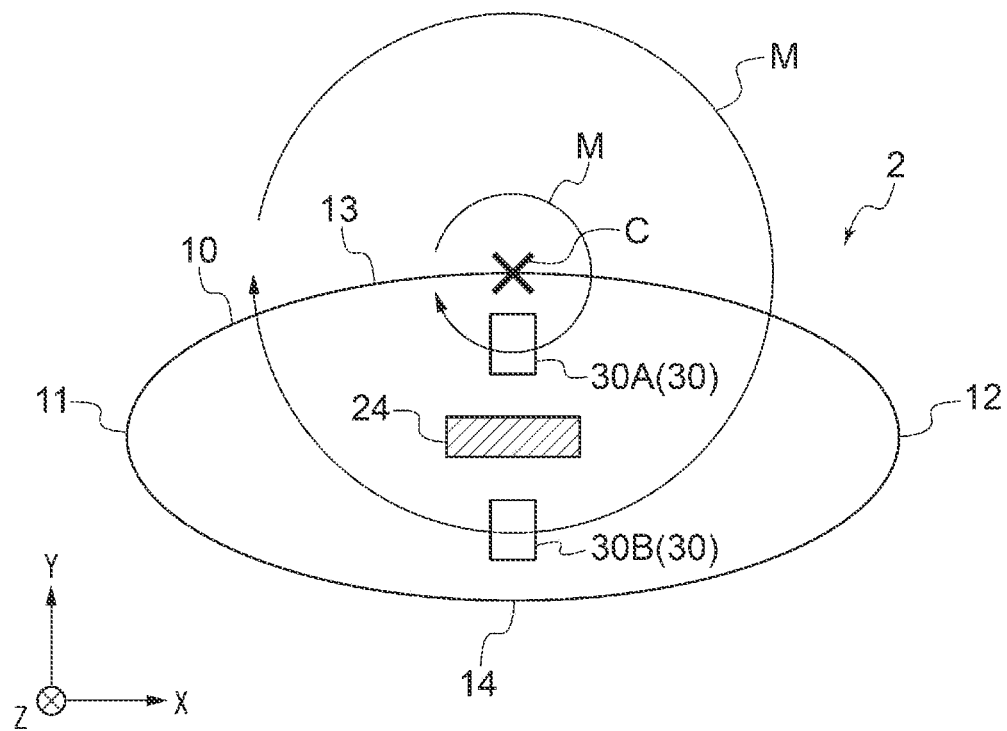
FIG. 5B is a schematic cross-sectional view of the wind turbine blade according to an embodiment.
Figure 6A:
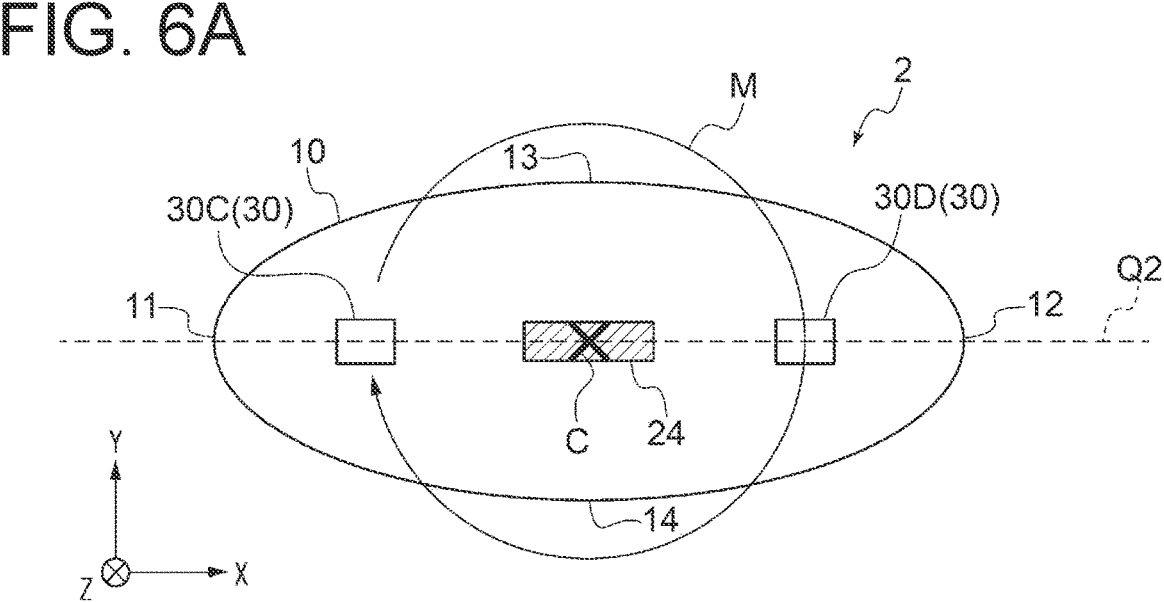
FIG. 6A is a schematic cross-sectional view of the wind turbine blade according to an embodiment.
Figure 6B:
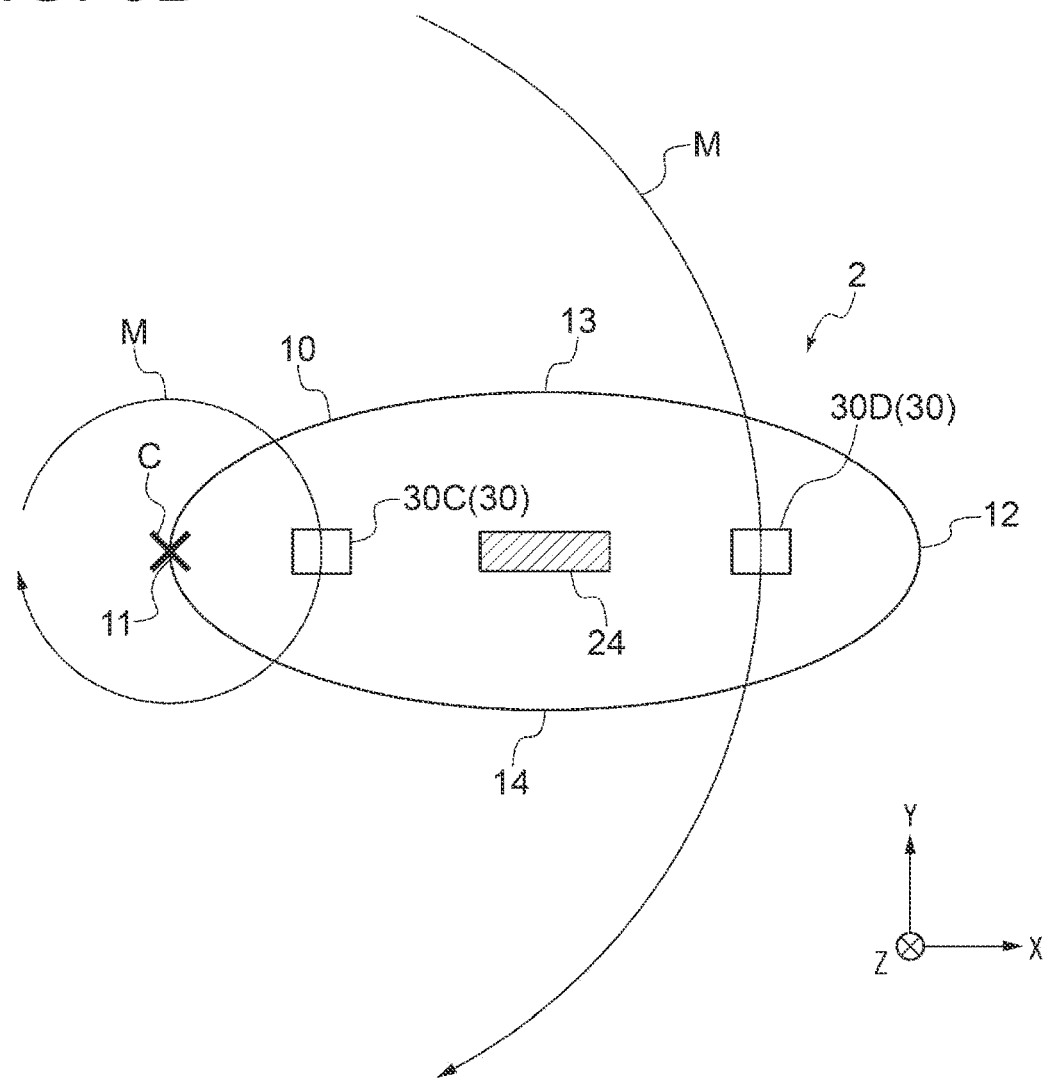
FIG. 6B is a schematic cross-sectional view of the wind turbine blade according to an embodiment.

For example, in the embodiments shown in FIGS. 5A-5B and FIGS. 6A-6B, if the positive polarity lightning current C has flowed through down conductor 24, as shown in FIG. 5A and FIG. 6A, a pair of magnetic field sensors 30A, 30B or a pair of magnetic field sensors 30D detect the magnetic fields M in opposite directions. On the other hand, in the same embodiments, if the positive polarity lightning current C flows through the blade body 10, the directions of the magnetic fields M detected by a pair of magnetic field sensors 30 are no longer opposite to each other. Specifically, for example, as shown in FIG. 5B, if the lightning current C flows through the blade body 10 on the suction surface 13 side, both of a pair of magnetic field sensors 30A, 30B detect the magnetic fields M in the negative direction of the X axis. Further, for example, as shown in FIG. 6B, if the lightning current C flows through the blade body 10 on the leading edge 11 side, both of a pair of magnetic field sensors 30C, 30D detect the magnetic fields M in the negative direction of the Y axis.

Thus, in the above-described embodiments, it can be determined that the lightning current C has flowed through the down conductor 24 when the directions of the magnetic fields M detected by the pair of magnetic field sensors 30 are opposite to each other. Further, it can be determined that the lightning current C has flowed through the portion (the blade body or the like) other than the down conductor 24 when the directions of the magnetic fields M detected by a pair of magnetic field sensors 30 are the same, and therefore, it can be identified that lightning has struck the location (blade body 10 or the like) other than the portion of the wind turbine blade 2 where the receptor 20 is installed. That is, it is possible to acquire the information about the lightning-struck position of the wind turbine blade 2. Thus, it is possible to appropriately identify the lightning-struck position in the wind turbine blade 2.

Figure 7:
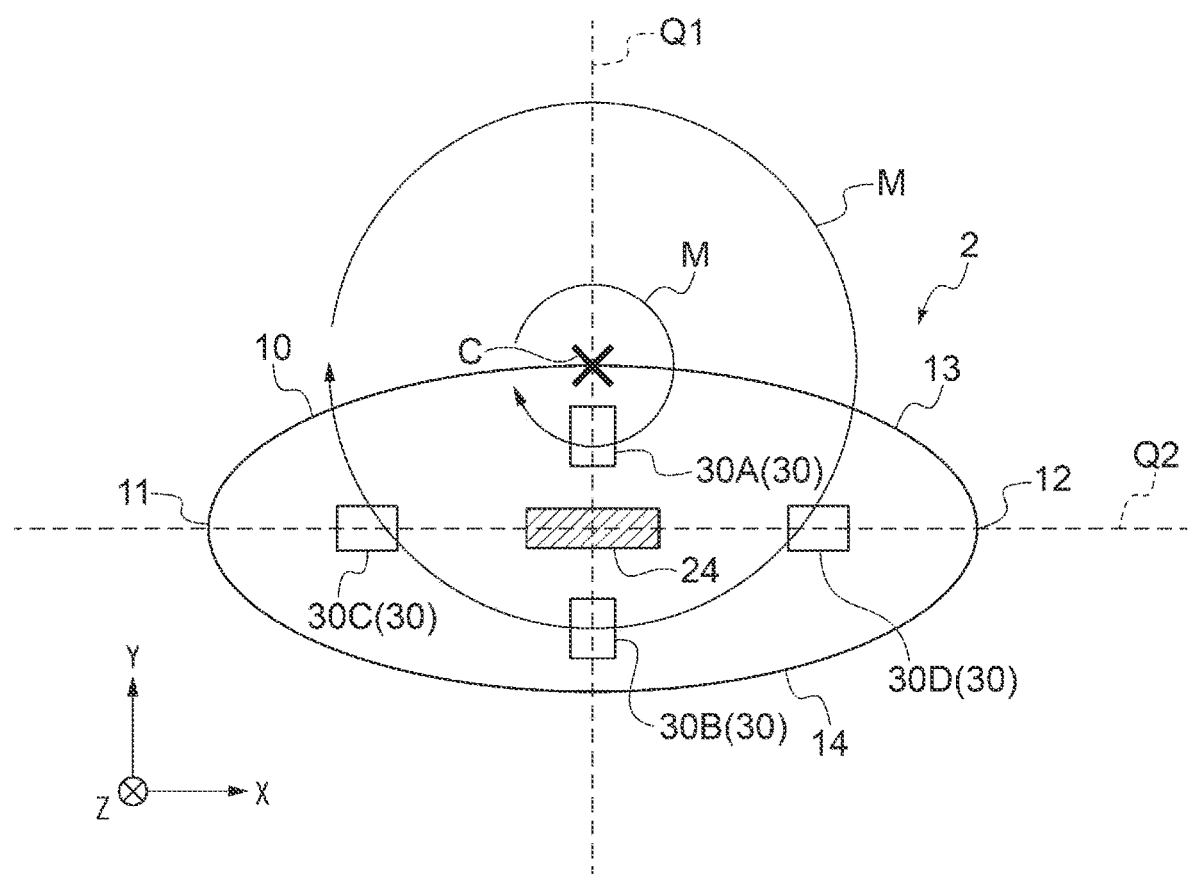
FIG. 7 is a schematic cross-sectional view of the wind turbine blade according to an embodiment.
Figure 8:
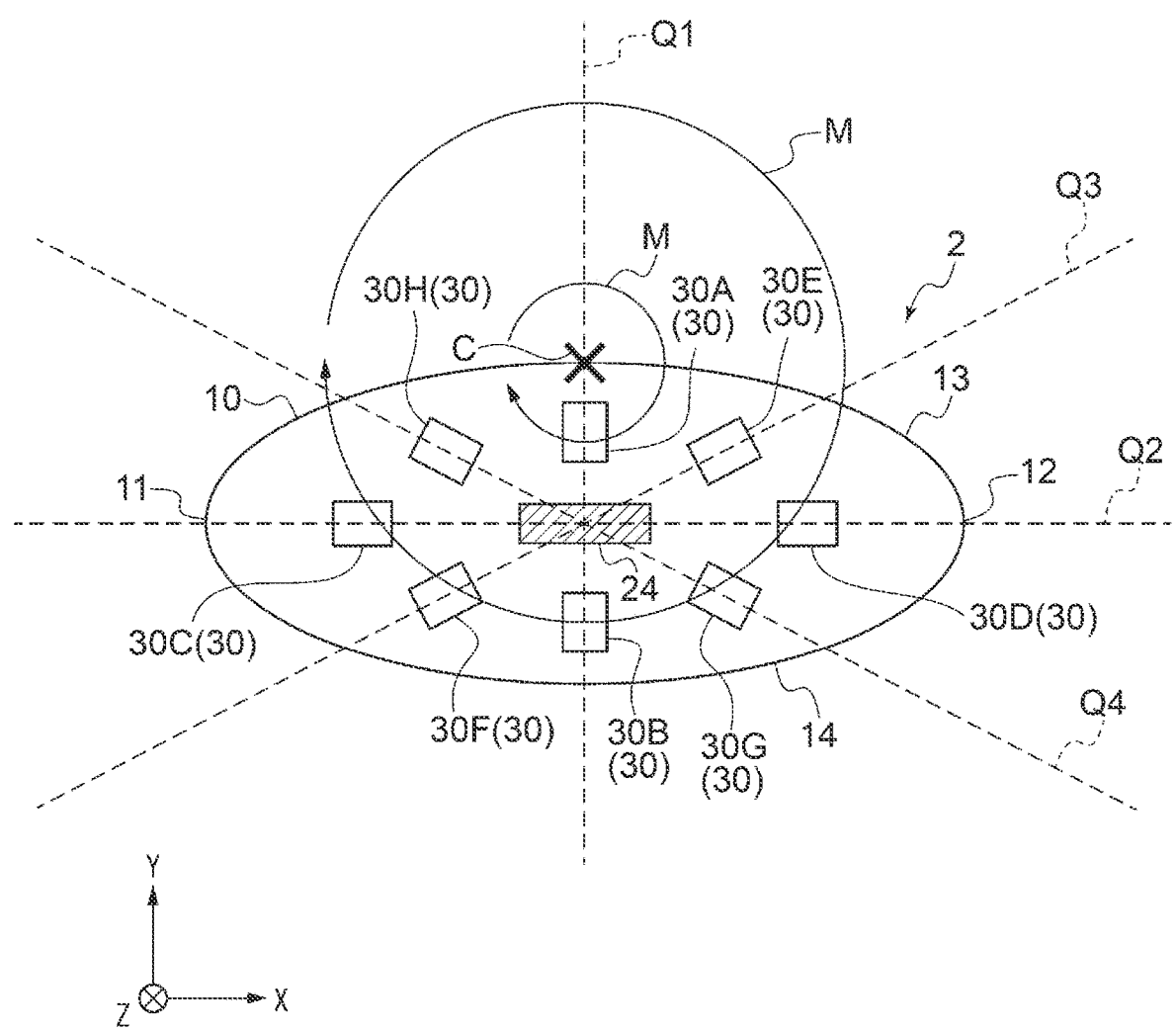
FIG. 8 is a schematic cross-sectional view of the wind turbine blade according to an embodiment.

The same effect can be obtained from the embodiments shown in FIGS. 7 and 8 as well.

In some embodiments, in addition to the detection results of the magnetic field sensors 30, the information about the lightning-struck position of the wind turbine blade 2 may be acquired based on the polarity of the lightning current C detected by the lightning current sensor 36.

The lightning current C may have a positive polarity or may have a negative polarity, and depending on the polarity of the lightning current C, the direction of the magnetic field generated around the lightning current C differs. That is, FIGS. 5A to 8 show that the positive polarity lightning current C generates the magnetic field M in the right (clockwise) direction on the drawing, but in the case of a negative polarity lightning current, the magnetic field M is generated in the left (counterclockwise) direction on the drawing.

In this regard, according to the above-described embodiments, it is possible to identify in more detail the portion of the wind turbine blade where the lightning current has flowed, based on the detection result of each of the a pair of magnetic field sensors 30 (that is, the direction of the magnetic field M at the installation position of each of a pair of magnetic field sensors 30) and the polarity of the lightning current C detected by the lightning current sensor 36. Thus, it is possible to identify in more detail the lightning-struck position in the wind turbine blade.

As an example, in the wind turbine blade 2 of the embodiments shown in FIGS. 5A and 5B, it is possible to identify the portion of the wind turbine blade 2 through which the lightning current C has flowed or the lightning-struck position, based on the detection results of a pair of magnetic field sensors 30A, 30B and the polarity of the lightning current C detected by the lightning current sensor 36, as shown in Table 1 below.

TABLE 1

| lightning current polarity | positive | positive | positive | negative | negative | negative |
|---|---|---|---|---|---|---|
| direction of magnetic field (suction surface side; X direction) | positive | negative | positive | positive | negative | negative |
| direction of magnetic field (pressure surface side; X direction) | negative | negative | positive | positive | positive | negative |
| portion where lightning current flows: blade body surface (suction surface side) |  | ○ |  | ○ |  |  |
| portion where lightning current flows: down conductor | ○ |  |  |  | ○ |  |
| portion where lightning current flows: blade body surface (pressure surface side) |  |  | ○ |  |  | ○ |

If it is determined that the lightning current C has flowed through the blade body 10 on the suction surface 13 side (or the pressure surface 14 side), it can be identified that lightning has struck the blade body 10 on the suction surface 13 side (or the pressure surface 14 side) of the wind turbine blade 2. Further, if it is determined that the lightning current C has flowed through the down conductor 24, it can be identified that the lightning has struck the receptor 20 electrically connected to the down conductor 24, or the lightning current C when the lightning strikes the blade body 10 has flowed into the down conductor 24 in the middle of flowing through the blade body 10 toward the ground.

In some embodiments, at least the pair of magnetic field sensors 30 includes a pair of first sensors disposed on a first axis passing through the installation position of the down conductor 24 in a cross section intersecting the longitudinal direction, and a pair of second sensors disposed on a second axis passing through the installation position of the down conductor 24 and orthogonal to the first axis in the same cross section. For example, in the exemplary embodiments shown in FIGS. 7 and 8, at least the pair of magnetic field sensors 30 includes the magnetic field sensors 30C, 30D which are the a pair of first sensors disposed on the X axis (the first axis; indicated by a straight line Q2) passing through the installation position of the down conductor 24 in the cross section intersecting the longitudinal direction, and the magnetic field sensors 30A, 30B which are the a pair of second sensors disposed on the Y axis (the second axis; indicated by a straight line Q1) passing through the installation position of the down conductor 24 and orthogonal to the X axis (first axis) in the same cross section.

According to the above-described embodiments, since the a pair of first sensors (magnetic field sensors 30C, 30D) are disposed on the above-described X-axis (first axis) (for example, the X-axis) and the a pair of second sensors (magnetic field sensors 30A, 30B) are disposed on the second axis (for example, the Y axis) orthogonal to the first axis (X axis) in the cross section intersecting the longitudinal direction of the wind turbine blade 2, it is possible to identify in more detail the portion of the wind turbine blade 2 where the lightning current C has flowed. Thus, it is possible to identify in more detail the lightning-struck position in the wind turbine blade 2.

In some embodiments, at least the pair of magnetic field sensors 30 includes, in addition to a pair of first sensors and the a pair of second sensors described above, a pair of third sensors disposed on a third axis passing through the installation position of the down conductor 24 and intersecting the first axis and the second axis in the above-described cross section. For example, in the exemplary embodiment shown in FIG. 8, in the cross section intersecting the longitudinal direction, at least the pair of magnetic field sensors 30 includes a pair of magnetic field sensors 30E, 30F (third sensors) disposed on the third axis (indicated by a straight line Q3) intersecting the X axis (first axis) and the Y axis (second axis), and a pair of magnetic field sensors 30G, 30H (third sensors) disposed on the third axis (indicated by a straight line Q4) intersecting the X axis (first axis) and the Y axis (second axis).

According to the above-described embodiment, since the a pair of third sensors (magnetic field sensors 30D to 30H) are disposed on the third axis intersecting the first axis and the second axis, in addition to the a pair of first sensors and a pair of second sensors described above, in the cross section intersecting the longitudinal direction of the wind turbine blade 2, it is possible to identify in more detail the portion of the wind turbine blade 2 where the lightning current C has flowed. Thus, it is possible to identify in more detail the lightning-struck position in the wind turbine blade 2.

In some embodiments, $0.75 \leq L1/L2 \leq 1.25$ is satisfied, where L1 is a distance between the magnetic field sensor 30 and the down conductor 24 in the cross section orthogonal to the longitudinal direction, and L2 is a distance between the magnetic field sensor 30 and the surface of the blade body 10 in the same cross section. In FIG. 3, the above-described distances L1 and L2 for the magnetic field sensor 30A are indicated by $L_{1A}$ and $L_{2A}$. Likewise, in FIG. 3, the above-described distances L1 and L2 for the magnetic field sensors 30B to 30D are, respectively, indicated by $L_{1B}$ to $L_{1D}$ and $L_{2B}$ to $L_{2D}$.

According to the above-described embodiments, the ratio of the distance L1 between the magnetic field sensor 30 and the down conductor 24 and the distance L2 between the magnetic field sensor 30 and the surface of the blade body 10 is close to 1, that is, L1 and L2 are approximately in the same range. Therefore, the intensity of the magnetic field generated around the lightning current at the position of the magnetic field sensor 30 is approximately the same between the case where the lightning current of the same magnitude has flowed through the down conductor 24 and the case where the lightning current of the same magnitude has flowed through the surface of the blade body 10. Thus, it is possible to appropriately detect the magnetic field M at the position of the magnetic field sensor 30, regardless of whether the lightning current C has flowed through either the down conductor 24 or the blade body 10.

In some embodiments, for example, as shown in FIG. 2, at least the pair of magnetic field sensors 30 includes blade root-side sensors 32 disposed on the blade root 15 side relative to a central position between the blade tip 16 and the blade root 15 of the blade body 10 in the longitudinal direction. In FIG. 2, S is a length of the blade body 10 in the longitudinal direction, and a position of half the length (S/2) from the blade root 15 or the blade tip 16 is the above-described central position.

According to the above-described embodiments, since the blade root-side sensors 32 (magnetic field sensors 30) are disposed in the blade root 15 side area of the wind turbine blade 2 through which the lightning current flowing through the down conductor 24 or the blade body 10 toward the ground passes, it is possible to appropriately detect the magnetic field M generated around the lightning current C.

In some embodiments, for example, as shown in FIG. 2, at least the pair of magnetic field sensors 30 includes a plurality of pairs of magnetic field sensors 30 respectively disposed at a plurality of positions in the longitudinal direction.

According to the above-described embodiments, since at least the pair of magnetic field sensors 30 are respectively installed at the plurality of positions in the longitudinal direction inside the blade body 10, based on the detection result of the magnetic field sensor 30 at each position in the longitudinal direction, it is possible to identify the range of the lightning-struck position in the longitudinal direction. Further, based on the determination result of the portion where the lightning current has flowed on the basis of the detection result of the magnetic field sensor 30 at each position in the longitudinal direction, for example, it is possible to detect that the lightning current flowing through the blade body 10 has flowed into the down conductor 24 in the middle of the longitudinal direction in the wind turbine blade 2.

In some embodiments, for example, as shown in FIG. 2, at least the pair of magnetic field sensors 30 includes at least the pair of blade root-side sensors 32 disposed on the blade root 15 side relative to the central position between the blade tip 16 and the blade root 15 of the blade body 10, and a plurality of pairs of blade tip-side sensors 34 disposed on the blade tip 16 side relative to the above-described central position, in the longitudinal direction. Then, the number of blade tip-side sensors 34 is greater than the number of blade root-side sensors 32.

In the wind turbine blade 2, lightning tends to strike the blade tip 16 side portion relative to the blade root 15 side portion. In this respect, according to the above-described embodiments, since the relatively large number of blade tip-side sensors 34 (magnetic field sensors 30) are disposed in the blade tip 16 side area, it is possible to identify in more detail the portion through which the lightning current flows or the lightning-struck position in the blade tip 16 side area of the wind turbine blade 2 which is relatively susceptible to a lightning strike. Thus, as the whole wind turbine blade 2, it is possible to efficiently identify the lightning-struck position while suppressing the number of magnetic field sensors 30 to be installed.

In some embodiments, the number of blade tip-side sensors 34 in a first cross section orthogonal to the longitudinal direction (for example, a cross section at a position taken along line A-A in FIG. 2) is greater than the number of blade root-side sensors 32 in a second cross section orthogonal to the longitudinal direction (for example, a cross section at a position taken along line B-B in FIG. 2). For example, in the second cross section on the blade root 15 side, a pair of blade root-side sensors 32 may be disposed on the both sides of the down conductor 24 in the X-axis direction as shown in FIGS. 7A and 7B, and in the first cross section on the blade tip 16 side, a pair of blade root-side sensors 32 (a total of two pairs of blade root-side sensors 32) may be disposed on both sides of the down conductor 24 in each of the X-axis direction and the Y-axis direction as shown in FIG. 9.

According to the above-described embodiments, since the number of magnetic field sensors 30 in the cross section orthogonal to the longitudinal direction is greater on the blade tip 16 side than on the blade root 15 side, it is possible to identify in more detail the portion through which the lightning current flows or the lightning-struck position in the blade tip 16 side area of the wind turbine blade 2 which is relatively susceptible to a lightning strike. Thus, as the whole wind turbine blade 2, it is possible to efficiently identify the lightning-struck position while suppressing the number of magnetic field sensors 30 to be installed.

The contents described in the above embodiments would be understood as follows, for instance.

(1) A wind turbine blade (2) according to at least one embodiment of the present invention includes: a blade body (10); a down conductor (24) extending along a longitudinal direction of the blade body; and at least a pair of magnetic field sensors (30) disposed inside the blade body and at opposite positions across the down conductor, the pair of magnetic field sensors being configured to detect a local magnetic field at each of the positions.

When the lightning current flows through the wind turbine blade, the magnetic field is generated around the lightning current. Herein, the direction of the aforementioned magnetic field at the position of the magnetic field sensor differs depending on a positional relationship between the magnetic field sensor and the portion (such as the down conductor or the blade body (shell, etc.) of the wind turbine blade where the lightning current flows. In this respect, with the above configuration (1), since a pair of magnetic field sensors are disposed on the both sides of the down conductor inside the wind turbine blade, it is possible to determine whether the lightning current has flowed through the down conductor, based on the directions of the magnetic fields detected by the magnetic field sensors when the lightning current flows through the wind turbine blade. For example, it can be determined that the lightning current has flowed through the portion (the blade body or the like) other than the down conductor when the directions of the magnetic fields detected by the a pair of magnetic field sensors are the same, and it can be identified that lightning strikes the location (blade body or the like) other than the portion of the wind turbine blade where the receptor is installed. Thus, it is possible to appropriately identify the lightning-struck position in the wind turbine blade.

(2) In some embodiments, in the above configuration (1), the wind turbine blade includes a lightning current sensor (36) disposed on a path of a lightning current from the down conductor toward a ground, the lighting current sensor being configured to detect a polarity of the lightning current.

The lightning current may have a positive polarity or may have a negative polarity, and depending on the polarity of the lightning current, the direction of the magnetic field generated around the lightning current differs. In this respect, with the above configuration (2), it is possible to detect the polarity of the lightning current by the lightning current sensor disposed on the path of the lightning current from the down conductor toward the ground. Therefore, it is possible to identify in more detail the portion of the wind turbine blade where the lightning current has flowed, based on the direction of the magnetic field detected by the magnetic field sensor described above and the polarity of the lightning current detected by the lightning current sensor. Thus, it is possible to identify in more detail the lightning-struck position in the wind turbine blade.

The lightning current flowing through the blade body toward the ground normally flows into the down conductor before reaching the ground. Thus, even if lightning strikes the blade body and the lightning current flows through the blade body, the above-described lightning current sensor can detect the polarity of the lightning current. Further, if the lightning current sensor detects the magnitude of the lightning current, the degree of damage to the wind turbine blade due to the lightning strike can be estimated based on the magnitude of the detected lightning current. Thus, the maintenance of the wind turbine blade can effectively be performed by utilizing the information about the degree of the damage to the wind turbine blade thus obtained.

(3) In some embodiments, in the above configuration (1) or (2), at least the pair of magnetic field sensors includes: a first sensor which is disposed on a first axis (such as the axis in the straight line Q2 direction described above) passing through an installation position of the down conductor in a cross section intersecting the longitudinal direction; and a second sensor which is disposed on a second axis (such as the axis in the straight line Q1 direction described above) passing through the installation position and is orthogonal to the first axis in the cross section.

With the above configuration (3), since the first sensor (magnetic field sensor) is disposed on the above-described first axis and the second sensor (magnetic field sensor) is disposed on the second axis orthogonal to the first axis in the cross section intersecting the longitudinal direction of the wind turbine blade, it is possible to identify in more detail the portion of the wind turbine blade where the lightning current has flowed. Thus, it is possible to identify in more detail the lightning-struck position in the wind turbine blade.

(4) In some embodiments, in the above configuration (3), at least the pair of magnetic field sensors includes a third sensor which is disposed on a third axis (such as the axis in the straight line Q3 direction or the straight line Q4 direction described above) passing through the installation position of the down conductor and intersecting the first axis and the second axis in the cross section.

With the above configuration (4), since the third sensor (magnetic field sensor) is disposed on the third axis intersecting the first axis and the second axis, in addition to the first sensors and the second sensor described above, in the cross section intersecting the longitudinal direction of the wind turbine blade, it is possible to identify in more detail the portion of the wind turbine blade where the lightning current has flowed. Thus, it is possible to identify in more detail the lightning-struck position in the wind turbine blade.

(5) In some embodiments, in any one of the above configurations (1) to (4), $0.75 \leq L1/L2 \leq 1.25$ is satisfied, where L1 is a distance between the down conductor and one of at least the pair of magnetic field sensors in a cross section orthogonal to the longitudinal direction, and L2 is a distance between the one of at least the pair of magnetic field sensors and a surface of the blade body in the cross section.

With the above configuration (5), the ratio of the distance L1 between the magnetic field sensor and the down conductor and the distance L2 between the magnetic field sensor and the surface of the blade body is close to 1, that is, L1 and L2 are approximately in the same range. Therefore, the intensity of the magnetic field generated around the lightning current at the position of the magnetic field sensor is approximately the same between the case where the lightning current of the same magnitude has flowed through the down conductor and the case where the lightning current of the same magnitude has flowed through the surface of the blade body. Thus, it is possible to appropriately detect the magnetic field at the position of the magnetic field sensor, regardless of whether the lightning current has flowed through either the down conductor or the blade body.

(6) In some embodiments, in any one of the above configurations (1) to (5), the down conductor is disposed inside the blade body.

With the above configuration (6), in the wind turbine blade where the down conductor is disposed inside the blade body, it is possible to determine the presence or absence of the possibility that the lightning current has flowed through the down conductor, based on the direction of the magnetic field detected by the magnetic field sensor. Thus, it is possible to identify the lightning-struck position in the wind turbine blade to some extent.

(7) In some embodiments, in any one of the above configurations (1) to (6), at least the pair of magnetic field sensors includes a blade root-side sensor (32) disposed on a side of a blade root (15) of the blade body relative to a central position between the blade root and a blade tip (16) of the blade body in the longitudinal direction.

With the above configuration (7), since the blade root-side sensor (magnetic field sensor) is disposed in the blade root side area of the wind turbine blade through which the lightning current flowing through the down conductor or the blade body toward the ground passes, it is possible to appropriately detect the magnetic field generated around the lightning current.

(8) In some embodiments, in any one of the above configurations (1) to (7), at least the pair of magnetic field sensors includes a plurality of pairs of magnetic field sensors respectively disposed at a plurality of positions in the longitudinal direction.

With the above configuration (8), since at least the pair of magnetic field sensors are respectively installed at the plurality of positions in the longitudinal direction inside the blade body, based on the detection result of each of the a pair of magnetic field sensors at a corresponding one of the positions in the longitudinal direction, it is possible to identify the range of the lightning-struck position in the longitudinal direction. Further, based on the determination result of the portion where the lightning current has flowed on the basis of the detection result of at least the pair of magnetic field sensors at each position in the longitudinal direction, for example, it is possible to detect that the lightning current flowing through the blade body has flowed into the down conductor in the middle of the longitudinal direction in the wind turbine blade.

(9) In some embodiments, in the above configuration (8), the plurality of pairs of magnetic field sensors include at least a pair of blade root-side sensors (32) disposed on a side of a blade root of the blade body relative to a central position between the blade root and a blade tip of the blade body, and a plurality of pairs of blade tip-side sensors (34) disposed on a side of the blade tip relative to the central position, in the longitudinal direction, and the plurality of pairs of blade tip-side sensors is greater in number than at least the pair of blade root-side sensors.

In the wind turbine blade, lightning tends to strike the blade tip side portion relative to the blade root side portion. In this respect, with the above configuration (9), since the relatively large number of blade tip-side sensors (magnetic field sensors) are disposed in the blade tip side area, it is possible to identify in more detail the portion through which the lightning current flows or the lightning-struck position in the blade tip side area of the wind turbine blade which is relatively susceptible to a lightning strike. Thus, as the whole wind turbine blade, it is possible to efficiently identify the lightning-struck position while suppressing the number of magnetic field sensors to be installed.

(10) In some embodiments, in the above configuration (9), the plurality of pairs of blade tip-side sensors in a first cross section orthogonal to the longitudinal direction is greater in number than at least the pair of blade root-side sensors in a second cross section orthogonal to the longitudinal direction.

With the above configuration (10), since the number of magnetic field sensors in the cross section orthogonal to the longitudinal direction is greater on the blade tip side than on the blade root side, it is possible to identify in more detail the portion through which the lightning current flows or the lightning-struck position in the blade tip side area of the wind turbine blade which is relatively susceptible to a lightning strike. Thus, as the whole wind turbine blade, it is possible to efficiently identify the lightning-struck position while suppressing the number of magnetic field sensors to be installed.

(11) A monitoring apparatus (50) according to at least one embodiment of the present invention is a monitoring apparatus for a wind turbine blade that includes a blade body and a down conductor extending along a longitudinal direction of the blade body, including: at least a pair of magnetic field sensors disposed inside the blade body and in the wind turbine blade at opposite positions across the down conductor, a pair of magnetic field sensors being configured to detect a local magnetic field at each of the positions; and a lightning-struck position information acquisition part (42) for acquiring information about a lightning-struck position of the wind turbine blade, based on a detection signal of each of at least the pair of magnetic field sensors.

With the above configuration (11), since a pair of magnetic field sensors are disposed on the both sides of the down conductor inside the wind turbine blade, it is possible to determine whether the lightning current has flowed through the down conductor, based on the directions of the magnetic fields detected by the magnetic field sensors when the lightning current flows through the wind turbine blade. Thus, it is possible to appropriately identify the lightning-struck position in the wind turbine blade.

(12) A wind power generating apparatus (1) according to at least one embodiment of the present invention includes: a wind turbine rotor including the wind turbine blade according to any one of the above (1) to (10); a generator configured to be driven by rotation of the wind turbine rotor; and a monitoring apparatus (50) including a lightning-struck position information acquisition part (42) for acquiring information about a lightning-struck position of the wind turbine blade, based on a detection signal of each of at least the pair of magnetic field sensors.

With the above configuration (12), since a pair of magnetic field sensors are disposed on the both sides of the down conductor inside the wind turbine blade, it is possible to determine whether the lightning current has flowed through the down conductor, based on the directions of the magnetic fields detected by the magnetic field sensors when the lightning current flows through the wind turbine blade. Thus, it is possible to appropriately identify the lightning-struck position in the wind turbine blade.

(13) A monitoring method for a wind turbine blade according to at least one embodiment of the present invention is a monitoring method for a wind turbine blade that includes a blade body (10) and a down conductor (24) extending along a longitudinal direction of the blade body, including: a step of detecting, by using at least a pair of magnetic field sensors (30) disposed inside the blade body and in the wind turbine blade at opposite positions across the down conductor, a local magnetic field at each of the positions; and a step of acquiring information about a lightning-struck position of the wind turbine blade, based on a detection signal of each of at least the pair of magnetic field sensors.

With the above method (13), since a pair of magnetic field sensors are disposed on the both sides of the down conductor inside the wind turbine blade, it is possible to determine whether the lightning current has flowed through the down conductor, based on the directions of the magnetic fields detected by the magnetic field sensors when the lightning current flows through the wind turbine blade. Thus, it is possible to appropriately identify the lightning-struck position in the wind turbine blade.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Wind power generating apparatus
2 Wind turbine blade
4 Hub
5 Rotor
6 Tower
8 Nacelle
10 Blade body
11 Leading edge
12 Trailing edge
13 Suction surface
14 Pressure surface
15 Blade root
16 Blade tip
20 Receptor
21 Receptor
22 Receptor
24 Down conductor
26 Down conductor
30A to 30H Magnetic field sensors
32 Blade root-side sensor
34 Blade tip-side sensor
36 Lightning current sensor
40 Processing device
42 Lightning-struck position information acquisition part
50 Monitoring apparatus
C Lightning current
M Magnetic field

The invention claimed is:

1. A wind turbine blade, comprising:
    a blade body;
    a down conductor extending along a longitudinal direction of the blade body; and
    at least a pair of magnetic field sensors disposed inside the blade body and at opposite positions across the down conductor, a pair of magnetic field sensors being configured to detect a local magnetic field at each of the positions, wherein
    at least the pair of magnetic field sensors comprises:
        a first sensor disposed on a first axis passing through an installation position of the down conductor in a cross section intersecting the longitudinal direction; and
        a second sensor disposed on a second axis passing through the installation position and being orthogonal to the first axis in the cross section.

2. The wind turbine blade according to claim 1, further comprising:
    a lightning current sensor disposed on a path of a lightning current from the down conductor toward a ground, the lightning current sensor being configured to detect a polarity of the lightning current.

3. The wind turbine blade according to claim 1, wherein at least the pair of magnetic field sensors further comprises a third sensor disposed on a third axis passing through the installation position of the down conductor and intersecting the first axis and the second axis in the cross section.

4. The wind turbine blade according to claim 1, wherein $0.75 \leq L1/L2 \leq 1.25$ is satisfied, where
    L1 is a distance between the down conductor and one of at least the pair of magnetic field sensors in a cross section orthogonal to the longitudinal direction, and
    L2 is a distance between the one of at least the pair of magnetic field sensors and a surface of the blade body in the cross section.

5. The wind turbine blade according to claim 1, wherein the down conductor is disposed inside the blade body.

6. The wind turbine blade according to claim 1, wherein at least a pair of magnetic field sensors further comprises a blade root-side sensor disposed on a side of a blade root of the blade body relative to a central position between the blade root and a blade tip of the blade body in the longitudinal direction.

7. The wind turbine blade according to claim 1, wherein at least the pair of magnetic field sensors further comprises a plurality of pairs of magnetic field sensors respectively disposed at a plurality of positions in the longitudinal direction.

8. The wind turbine blade according to claim 7, wherein the plurality of pairs of magnetic field sensors comprise:
    at least a pair of blade root-side sensors disposed on a side of a blade root of the blade body relative to a central position between the blade root and a blade tip of the blade body; and
    a plurality of pairs of blade tip-side sensors disposed on a side of the blade tip relative to the central position, in the longitudinal direction, and the plurality of pairs of blade tip-side sensors is greater in number than at least the pair of blade root-side sensors.

9. The wind turbine blade according to claim 8, wherein the plurality of pairs of blade tip-side sensors in a first cross section orthogonal to the longitudinal direction is greater in number than at least a pair of blade root-side sensors in a second cross section orthogonal to the longitudinal direction.

10. A monitoring apparatus for a wind turbine blade that includes a blade body and a down conductor extending along a longitudinal direction of the blade body, comprising:
   at least a pair of magnetic field sensors disposed inside the blade body and in the wind turbine blade at opposite positions across the down conductor, the pair of magnetic field sensors being configured to detect a local magnetic field at each of the positions; and
   a lightning-struck position information acquisition part for acquiring information about a lightning-struck position of the wind turbine blade, based on a detection signal of each of at least the pair of magnetic field sensors, wherein
   at least the pair of magnetic field sensors comprises:
      a first sensor disposed on a first axis passing through an installation position of the down conductor in a cross section intersecting the longitudinal direction; and
      a second sensor disposed on a second axis passing through the installation position and being orthogonal to the first axis in the cross section.

11. A wind power generating apparatus, comprising:
   a wind turbine rotor including the wind turbine blade according to claim 1;
   a generator configured to be driven by rotation of the wind turbine rotor; and
   a monitoring apparatus comprising a lightning-struck position information acquisition part for acquiring information about a lightning-struck position of the wind turbine blade based on a detection signal of each of at least the pair of magnetic field sensors.

12. A monitoring method for a wind turbine blade that comprises a blade body and a down conductor extending along a longitudinal direction of the blade body, comprising:
   a step of detecting, by using at least a pair of magnetic field sensors disposed inside the blade body and in the wind turbine blade at opposite positions across the down conductor, a local magnetic field at each of the positions; and
   a step of acquiring information about a lightning-struck position of the wind turbine blade, based on a detection signal of each of at least the pair of magnetic field sensors, wherein
   at least the pair of magnetic field sensors comprises:
      a first sensor disposed on a first axis passing through an installation position of the down conductor in a cross section intersecting the longitudinal direction; and
      a second sensor disposed on a second axis passing through the installation position and being orthogonal to the first axis in the cross section.

* * * * *